United States Patent [19]

Fischer et al.

[11] Patent Number: 4,553,319

[45] Date of Patent: Nov. 19, 1985

[54] METHOD FOR CONNECTING THE ENDS OF STATOR WINDINGS TO THE STATOR SUPPLY TERMINALS

[75] Inventors: Bruno Fischer, Dietikon; Angelo Andretta, Urdorf, both of Switzerland

[73] Assignee: Micafil AG, Zurich, Switzerland

[21] Appl. No.: 551,260

[22] Filed: Nov. 14, 1983

Related U.S. Application Data

[62] Division of Ser. No. 341,140, Jan. 20, 1982, Pat. No. 4,428,113.

[30] Foreign Application Priority Data

Jan. 29, 1981 [CH] Switzerland ............................ 571/81

[51] Int. Cl.⁴ .......................................... H02K 15/00
[52] U.S. Cl. ..................................................... 29/596
[58] Field of Search ................. 29/732, 735, 736, 742, 29/749, 753, 755, 757, 761, 596, 863, 866

[56] References Cited

U.S. PATENT DOCUMENTS

| | | | |
|---|---|---|---|
| 3,395,448 | 8/1968 | Moore | 29/735 |
| 3,395,449 | 8/1968 | Moore | 29/735 |
| 3,636,621 | 1/1972 | Dammar | 29/735 |
| 4,000,764 | 1/1977 | Reiger, Jr. | 140/113 |
| 4,074,418 | 2/1978 | Pearsall | 29/596 |
| 4,203,196 | 5/1980 | Fukushima et al. | 29/753 |

FOREIGN PATENT DOCUMENTS 2330035  1/1975  Fed. Rep. of Germany ........ 29/734

Primary Examiner—Howard N. Goldberg
Assistant Examiner—P. W. Echols
Attorney, Agent, or Firm—Burns, Doane, Swecker & Mathis

[57] ABSTRACT

Apparatus for connecting the ends of stator windings to stator supply terminals comprises a stator holding device which holds a wound stator with each winding end held by a holding element and an insertion and clamping device which is displaceable toward the stator holding device and which comprises a tong-like gripper for each winding end which is swivelable toward and away and laterally with respect to the stator holding device 2 under variable tension. The grippers engage the winding ends and displace them into the respective supply terminals, whereupon the terminals are clamped by a clamping device.

4 Claims, 2 Drawing Figures

METHOD FOR CONNECTING THE ENDS OF STATOR WINDINGS TO THE STATOR SUPPLY TERMINALS

This application is a division of application Ser. No. 341,140, filed 1/20/82, now U.S. Pat. No. 4,428,113.

FIELD OF THE INVENTION

The present invention relates in general to a method and apparatus for connecting the ends of the windings of electrical stators to the supply terminals thereof and in particular to mechanicapneumatic apparatus for connecting the ends of stator windings as part of a fully automatic production process and a method of operating such apparatus.

BACKGROUND OF THE INVENTION

It is already known to connect the ends of stator windings to the stator supply terminals following winding of a stator coil while the stator is still disposed in the winding station of a winding machine. The connection is made, for example, by compressing or crimping the terminals about the respective winding ends. In a further operation, a final mechanical and electrical connection is made, for example, by soldering, welding or the like.

An unavoidable consequence of connecting the winding ends while the stator remains in the winding machine is that the winding machine is idle for extended periods of time. In addition, the winding ends are stressed differently at the individual terminals, which can cause inaccurate or defective connections.

SUMMARY OF THE INVENTION

Accordingly it is the object of the invention to provide, for a fully automatic production process, and particularly for production lines, method and apparatus for connecting winding ends to stator terminals under uniform and controllable conditions which ensure reliable connections and with a minimum of winding machine idle time.

The foregoing object is achieved in accordance with the present invention by apparatus comprising a stator holding device having holding elements for each of the winding ends; and an insertion and clamping device for gripping each of the winding ends, displacing the winding ends into engagement with the corresponding supply terminals and clamping each of the supply terminals to secure the corresponding winding ends thereto. The insertion and clamping device comprises a set of first and second piston actuated tong-like grippers for each winding for gripping the corresponding first and second winding ends, respectively, and first and second positioning devices which are pivotable with respect to vertical axes for laterally displacing the first and second tong grippers, respectively, with respect to the stator holding device; and first and second clamping tools for each winding for clamping the corresponding first and second supply terminals.

In accordance with one aspect of the present invention, a fluid actuated shifting device is provided for displacement of the insertion and clamping device and the stator holding device with respect to each other.

In accordance with a further aspect of the present invention, the winding end holding elements are independently actuable and spring biased.

In accordance with a still further aspect of the present invention, fluid actuated lever assemblies are provided for swinging each tong gripper toward and away from the stator holding device; and each of the positioning devices comprises a vertical shaft rotatable about the longitudinal axis thereof and a fluid actuator connected to the shaft by an eccentric.

In accordance with another aspect of the present invention, each of the fluid actuator lever systems comprises a first arm fixedly connected to the corresponding positioning device vertical shaft for rotation therewith and having a front end extending beyond the vertical shaft toward the stator holding device; a second arm pivotably connected at an intermediate location thereon to the first arm front end and connected at a first end to the corresponding tong gripper; and a fluid actuator mounted on the first arm and having a piston connected to the second arm.

In accordance with yet another aspect of the present invention, the fluid actuators are connected to a reducing valve which provides an operating pressure range of 0.4 to 2.0 bar.

In accordance with a further aspect of the present invention, the foregoing apparatus is operated by holding the winding ends of a fully wound stator in the respective holding elements of the stator holding device, moving the insertion and clamping device from a starting position toward the stator holding device with each of the tong grippers in an initial receiving position and open to receive the respective winding ends; closing the tong grippers when the tong grippers have received the respective winding ends, while maintaining the winding ends under tension by means of the holding elements; swinging each closed tong gripper back away from the stator holding device and inwardly such that the closed gripper ends move toward one another in pairs until the tong grippers are aligned with the corresponding stator supply terminals and the corresponding winding ends have been inserted therein; actuating the clamping tools to crimp the respective stator supply terminals, thereby securing the corresponding winding ends thereto; and finally opening and simultaneously swinging the tong grippers to the receiving position thereof while retracting the insertion and clamping device to the starting position thereof.

A particular advantage of the present invention is that all of the winding ends are handled simultaneously by the insertion and clamping device and are inserted into the stator supply terminals under predetermined and uniform tension.

Another advantage of the present invention is that the insertion and clamping device is universally adjustable with respect to stator diameters, wire thicknesses and the like, since the tong grippers may be swiveled both laterally and inwardly and outwardly with respect to the stator holding device and with respect to each other, so that all conventional types of terminals may be used without additional tooling or laborious adjustment of the insertion and clamping device.

A further advantage of the present invention resides in the fact that the winding ends are received, inserted and clamped in the supply terminals in a single device following sequentially after the winding operation, thus increasing the output of the winding machine, and therefore the capacity of the entire production line.

These and other features and advantages of the present invention will be disclosed in or apparent from the

BRIEF DESCRIPTION OF THE DRAWINGS

The preferred embodiment will be described with reference to the accompanying drawings in which.

DETAILED DESCRIPTION OF THE PREFERRED EMBODIMENT

Figure 1:
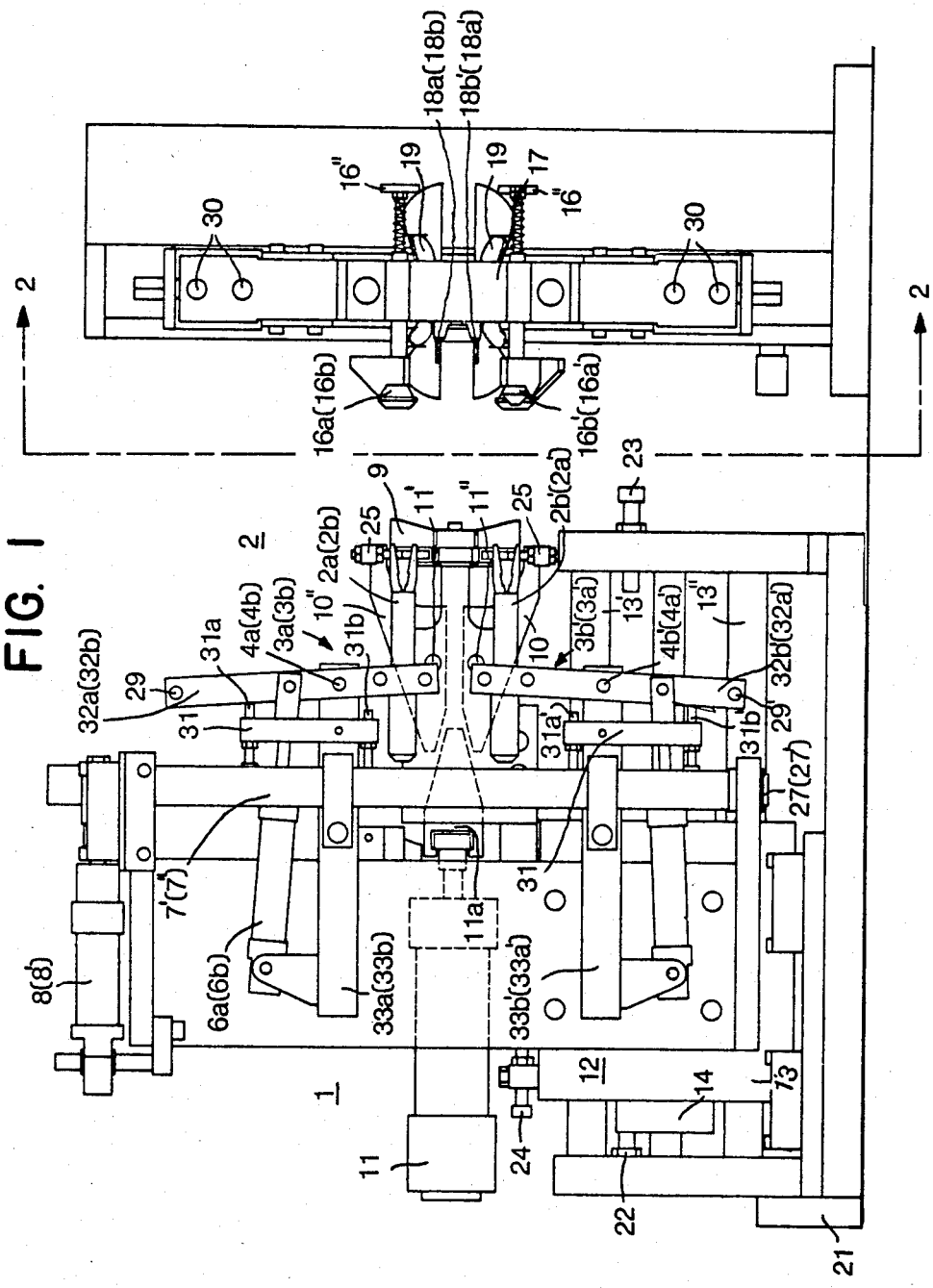
FIG. 1 is a side elevation view of apparatus constructed in accordance with the present invention.
Figure 2:
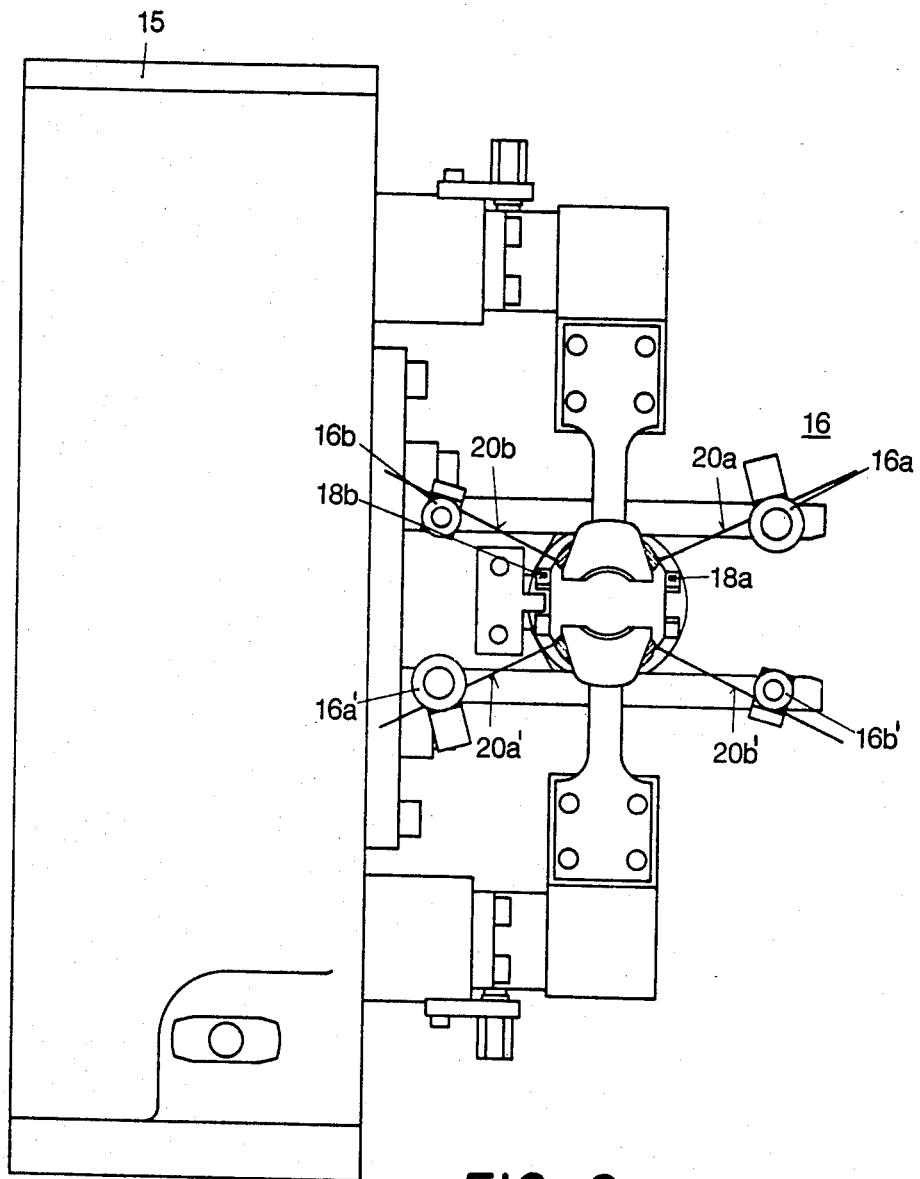
FIG. 2 is a front elevation view of the apparatus shown in FIG. 1 taken along the line 2—2.

Referring to FIGS. 1 and 2, a preferred embodiment of apparatus constructed in accordance with the present invention comprises a stator holding device 15 having holding elements generally denoted 16 for holding the respective winding ends of each stator winding and an insertion and clamping device 1 for gripping the respective winding ends of each winding, displacing the winding ends into engagement with the corresponding stator supply terminals; and clamping each of the supply terminals to secure the corresponding winding end thereto.

Referring specifically to FIG. 2, a stator 17 is shown which has already been wound and is held in stator holding device 15. Stator 17 has two coils or windings 19 and 19' with starting ends 20a and 20b, respectively, and finishing ends 20a' and 20b', respectively, which are held in holding elements 16a, 16b, 16a', and 16b', respectively, of stator holding device 15. Stator 17 also includes supply terminals 18a, 18b, 18a', and 18b'.

Stator holding device 15 advantageously is associated in a production line with a winding machine (not shown and not forming a part of the present invention), and the winding ends 20 advantageously are inserted into the corresponding holding elements 16 while holding device 15 is positioned in a winding station during the winding phase of the stator. As shown in FIG. 1, holding elements 16 advantageously comprise spring-biased bolts 16" which are opened either mechanically or manually during the winding phase.

Insertion and clamping device 1 is disposed in alignment with and opposite to stator holding device 15 and is mounted for displacement toward and away from stator holding device 15 in a shifting assembly, generally denoted 12, which comprises a carriage 13 slidably mounted in a pair of guideways 13' and 13". Carriage 13 is moved by a fluid actuated piston 14. The initial or starting position of carriage 13 is determined by a set screw 22 and the furthest position of travel of the carriage is determined by a stop screw 23 which abuts stator holding device 15 when insertion and clamping device 1 has travelled to the limit position thereof.

Insertion and clamping device 1 further comprises a winding end gripping device which comprises a piston actuated gripper, generally denoted 2, for each of the wire ends. Each gripper 2 is positionable by means of a fluid actuated lever system, generally denoted 3, and a pivoting system, generally denoted 7. Grippers 2 are simultaneously swingable toward and away from stator holding device 15 in pairs by means of lever system 3 and laterally inwardly with respect to each other by means of system 7.

System 7 advantageously comprises first and second vertically oriented shafts 7' and 7", respectively which are rotatably mounted in bearings 27, 27' for rotation about the vertical axes thereof. A fluid actuated piston 8, 8' which is eccentrically coupled to each shaft 7', 7" is provided for rotation thereof.

Lever system 3 comprises an articulated lever assembly 3a, 3b, 3a', 3b' for each gripper 2a, 2b, 2a', 2b', respectively, which each comprise a first arm 32 fixedly connected to a corresponding vertical shaft 7' for rotation therewith. As shown, lever assemblies 3a, 3b, 3a', 3b' advantageously are mounted on shafts 7', 7" in pairs, such that assemblies 3a and 3b' are mounted on one shaft 7' and asemblies 3a' and 3b are mounted on the other shaft 7". The front end of each arm 32 extends beyond the vertical shaft toward stator holding device 15, as shown, and is provided with a fulcrum 4 defining a rotational axis. Each lever assembly 3a, 3b, 3a', 3b' further comprises a second arm 33 pivotably connected at an intermediate location thereon to the corresponding first arm fulcrum 4 and is connected at a first end to the corresponding gripper 2 such that the gripper can be swung toward and away from stator holding device 15 by pivoting the second arm about fulcrum 4. A fluid actuated piston 6 is pivotably mounted on each first arm 32 and is connected to the corresponding second arm 33, as shown, for pivoting of the second arm. Advantageously, pistons 6 are connected to a reducing valve 21, which preferably provides an operating pressure in the range of 0.4 to 2.0 bar, which allows the stator winding ends to be displaced by grippers 2 under a predetermined tension.

Preferably, as shown, a stop member 31 having vertically spaced stops 31a and 31b is provided for each lever assembly, 3a, 3b, 3a', 3b' which limits the range of pivotal movement by arm 33. In addition, the arms 33 of opposing lever assemblies 3a, 3b and 3a', and 3b' are connected together by shafts 29 and 29', respectively.

Insertion and clamping device 1 further comprises a clamping tool 10 for each stator winding which comprises a pair of crimping elements 10', 10" pivotably mounted on fulcrums 11', 11". Clamping tools 10 are actuated by the pressure ram 11a of a fluid actuated piston 11. Clamping tools 10 advantageously are precisely positionable by means of a guide adjusted by means of an adjusting screw 24, and the crimping action of each crimping element 10', 10" is individually adjustable by means of an adjusting screw 25.

Insertion and clamping device 1 advantageously further comprises, as shown, a guide plate 9 which is mounted so as to be in alignment with stator holding device 15 and which has guide surfaces that cooperate with winding ends 20 to guide the winding ends into the respective stator terminals 18 as the winding ends are displaced by grippers 2.

In operation, once stator holding device 15 has been positioned in operative relationship with insertion and clamping device 1 following a stator winding operation, with winding ends 20 being held under tension by holding elements 16, shifting assembly 12 is actuated to displace insertion and clamping device 1 toward stator holding device 15 to an operating position adjacent stator holding device 15. Lever system 3, pivoting system 7 and grippers 2 are in initial states such that grippers 2 are open and positioned in a forwardly disposed winding end receiving position spaced from the corresponding supply terminals.

When winding ends 20 have been received by the respective grippers 2, grippers 2 are actuated to close and grip the respective winding ends. Pistons 6 and 8 are then simultaneously actuated to cause lever system 3 and pivoting system 7 to displace grippers 2 outwardly and laterally inwardly with respect to stator holding device 15, thereby positioning, with the aid of guide plate 9, winding ends 20 simultaneously in the respective supply terminals 18.

Piston 11 is then actuated to cause pressure ram 11a to close crimping elements 10', 10" of clamping tools 10, thereby simultaneously compressing supply terminals 18 and establishing a fixed connection between terminals 18 and the respective winding ends 20.

Finally, grippers 2 are actuated to open, and shifting assembly 12, lever system 3 and pivoting system 7 are actuated to simultaneously swing grippers 2 to the receiving position thereof while retracting insertion and clamping device 1 to the starting position thereof.

It will be appreciated that the present invention is not restricted to the preferred embodiment described hereinabove, and that changes and modifications can be made without departing from the scope and spirit of the invention.

We claim:

1. A method for connecting the first and second ends of at least one winding of a wound electrical stator to corresponding first and second stator supply terminals, comprising the steps of:

holding the first and second winding ends of a fully wound stator in respective holding elements of a stator holding means, moving insertion and clamping means toward said stator holding means with each of a pair of tong gripping means in an initial receiving position and open to receive the respective winding ends, when said tong gripping means have received the respective winding ends, closing said tong gripping means while the winding ends are maintained under tension by said holding elements, swinging each closed tong gripping means back away from said stator holding means and laterally inwardly such that the closed ends move toward one another in pairs until each tong gripping means is aligned with the corresponding stator supply terminal and the corresponding winding ends have been inserted therein;

actuating tool means to crimp the stator supply terminals, thereby securing the corresponding winding ends thereto; and opening and simultaneously swinging said tong gripping means to the receiving positions thereof while retracting said insertion and clamping means to the starting position thereof.

2. The method of claim 1 wherein the movements are effected pneumatically.

3. The method of claim 1 wherein the movements are effected hydraulically.

4. The method of claim 1 wherein the movements are effected mechanically.

* * * * *